US009398111B1

(12) United States Patent
Eilam et al.

(10) Patent No.: US 9,398,111 B1
(45) Date of Patent: Jul. 19, 2016

(54) FILE CACHING UPON DISCONNECTION

(71) Applicant: hopTo Inc., Campbell, CA (US)

(72) Inventors: Eldad Eilam, San Jose, CA (US); Sujay Sundaram, Suunyvale, CA (US)

(73) Assignee: HOPTO INC., Campbell, CA (US)

( * ) Notice: Subject to any disclaimer, the term of this patent is extended or adjusted under 35 U.S.C. 154(b) by 126 days.

(21) Appl. No.: 14/445,320

(22) Filed: Jul. 29, 2014

Related U.S. Application Data

(60) Provisional application No. 61/872,572, filed on Aug. 30, 2013.

(51) Int. Cl.
*G06F 15/16* (2006.01)
*H04L 29/08* (2006.01)

(52) U.S. Cl.
CPC ............ *H04L 67/2842* (2013.01); *H04L 67/06* (2013.01)

(58) Field of Classification Search
USPC ......... 709/213, 218, 219, 226, 223, 224, 248, 709/212
See application file for complete search history.

(56) References Cited

U.S. PATENT DOCUMENTS

| 6,085,234 | A * | 7/2000 | Pitts ...................... G06F 15/173 709/217 |
| 8,473,582 | B2 * | 6/2013 | Ananthanarayanan G06F 17/30132 709/212 |
| 2004/0133544 | A1 * | 7/2004 | Kiessig ............. G06F 17/30067 |
| 2004/0186861 | A1 * | 9/2004 | Phatak .............. G06F 17/30132 |
| 2005/0198379 | A1 | 9/2005 | Panasyuk et al. |
| 2006/0020646 | A1 * | 1/2006 | Tee ........................ G06F 17/301 |
| 2006/0080651 | A1 | 4/2006 | Gupta et al. |
| 2006/0129537 | A1 * | 6/2006 | Torii ................. G06F 17/30221 |
| 2006/0153064 | A1 | 7/2006 | Caballero-McCann et al. |
| 2007/0011707 | A1 * | 1/2007 | Holladay ........... G06Q 30/0204 725/78 |
| 2008/0183662 | A1 * | 7/2008 | Reed ................. G06F 17/30132 |
| 2010/0299187 | A1 | 11/2010 | Duggal |
| 2011/0145363 | A1 * | 6/2011 | Ananthanarayanan G06F 17/30132 709/218 |
| 2012/0226813 | A1 | 9/2012 | Ragusa et al. |
| 2013/0132463 | A1 | 5/2013 | Garcia-Ascanio et al. |
| 2014/0074802 | A1 * | 3/2014 | Blount .............. G06F 17/30117 707/692 |

OTHER PUBLICATIONS

U.S. Appl. No. 14/459,228 Office Action mailed Apr. 25, 2016.
U.S. Appl. No. 14/459,228, William Tidd, Maintaining A Client State Upon Disconnection, Aug. 13, 2014.

* cited by examiner

*Primary Examiner* — Jude Jean Gilles
(74) *Attorney, Agent, or Firm* — Polsinelli LLP

(57) ABSTRACT

Systems and methods for file caching are provided. A remote session is established with a host device via a communication network that allows a client device to access resources hosted on the host device. Such resources may include a file hosted on the host device, though the file opened using an application at the client device. A connection between the host device and the client device may be detected as interrupted, thereby terminating the remote session. Information regarding the file may be cached in memory of the client device upon detecting that the connection has been interrupted. Upon reconnection or start of a new connection, the cached information may be used to update the file at the host device. In some embodiments, the cached file may be accessible to the client device while off-line.

17 Claims, 2 Drawing Sheets

FILE CACHING UPON DISCONNECTION

CROSS-REFERENCE TO RELATED APPLICATIONS

This application claims the priority benefit of U.S. provisional patent application No. 61/872,572, filed on Aug. 30, 2013 and titled "File Caching Upon Disconnection," the disclosure of which is incorporated herein by reference.

BACKGROUND

1. Field of the Invention

Embodiments of the present invention generally relate to remotely accessing applications that are installed on a host device. More specifically, embodiments of the present invention relate to file caching upon disconnection from a remote access application.

2. Description of the Related Art

Individuals currently have a variety of options for communicating and carrying out transactions. Such options may include traditional desktop computing devices, as well as various mobile devices (e.g., mobile phones, smartphones, tablets). In fact, many individuals may use multiple computing and mobile devices at home, work, and on the move. For example, an individual may use a desktop computer at work, a laptop computer at home, and one or more mobile devices (e.g., smartphone, tablet) elsewhere. As such, people have come to expect to be able to have access to data and computing resources so to perform most computing tasks anywhere.

One difficulty in meeting such an expectation is that the various computing devices my not all have the same capabilities and functionalities. For example, such devices may run different operating systems/platforms and applications. Such differences may make it difficult to support the same tasks across such devices. One solution has been to provide remote desktops where a first device runs the applications and a second device receives the visual display that appears on the first device over a communication network (e.g., Internet). Such remote desktops can allow users to access and control resources and data on the first device at a remote location using a second (e.g., portable) device.

One drawback to such an approach arises from the fact that remote sessions depend on the connection between the host device and client device. As such, if the connection drops, information may be lost. Such information may include, for example, a user's modifications to a document or other edits. The loss of such information can be frustrating to a user who spent considerable time and effort modifying and revising a document remotely and has to start all over again because the remote connection failed.

There is a need in the art for improved systems and methods for maintaining a client state upon disconnection from a remote access application.

SUMMARY OF THE CLAIMED INVENTION

Embodiments of the present invention include systems and methods for maintaining a client state upon disconnection from a remotely accessed application. Such methods may include establishing a remote session between a host device and a client device via a communication network, wherein the client device is allowed to access resources hosted on the host device, tracking information regarding a state of the remote session including current information regarding the client device, the information being tracked by a server associated with the remote session, providing the client device with access to a file hosted on the host device, wherein the file is opened using an application also hosted on the host device, detecting that a connection between the host device and the client device has been interrupted, wherein the remote session is terminated, and storing information regarding a current state of the client device upon detection that the connection has been interrupted, the information being stored in memory of a server.

Various embodiments of the present invention include methods for file caching upon disconnection from a remotely accessed application. Such methods may include establishing a remote session between a host device and a client device via a communication network that allows the client device to access resources hosted on the host device, providing the client device with access to a file hosted on the host device and opened using an application at the client device, tracking information regarding a state of the file in memory, detecting that a connection between the host device and the client device has been interrupted, and caching information regarding the file upon detection that the connection has been interrupted, where the information is subsequently used to update the file hosted on the host device when another connection is established.

Further embodiments of the present invention include apparatuses for file caching upon disconnection from a remotely accessed application. Such apparatuses may include a communication interface that establishes a remote session between a host device and a client device via a communication network that allows the client device to access resources hosted on the host device and that provides the client device with access to a file hosted on the host device and opened using an application at the client device, memory that track information regarding a state of the file, and a processor that detects that a connection between the host device and the client device has been interrupted and instructs memory to cache information regarding the file upon detection that the connection has been interrupted, where the information is subsequently used to update the file hosted on the host device when another connection is established.

Other embodiments of the present invention include non-transitory computer-readable storage media on which is embodied instructions executable to perform a method for maintaining a client state upon disconnection from a remotely accessed application as previously set forth above.

DETAILED DESCRIPTION

Embodiments of the present invention comprise systems and methods for maintaining a client state upon disconnection from a remotely accessed application. A remote session may be established between a host device and a client device via a communication network that allows the client device to access resources hosted on the host device. Such a remote session may further involve an intermediary server. Information may be tracked regarding a state of the remote session including current information regarding the client device. Such information may be tracked by the server associated with the remote session. The client device may be provided with access to a file hosted on the host device, which may be opened using an application also hosted on the host device. A connection between the host device and the client device may be detected as having been interrupted, which may result in termination of the remote session. Information regarding a current state of the client device may be stored to memory in the server upon detection that the connection has been interrupted.

Figure 1:
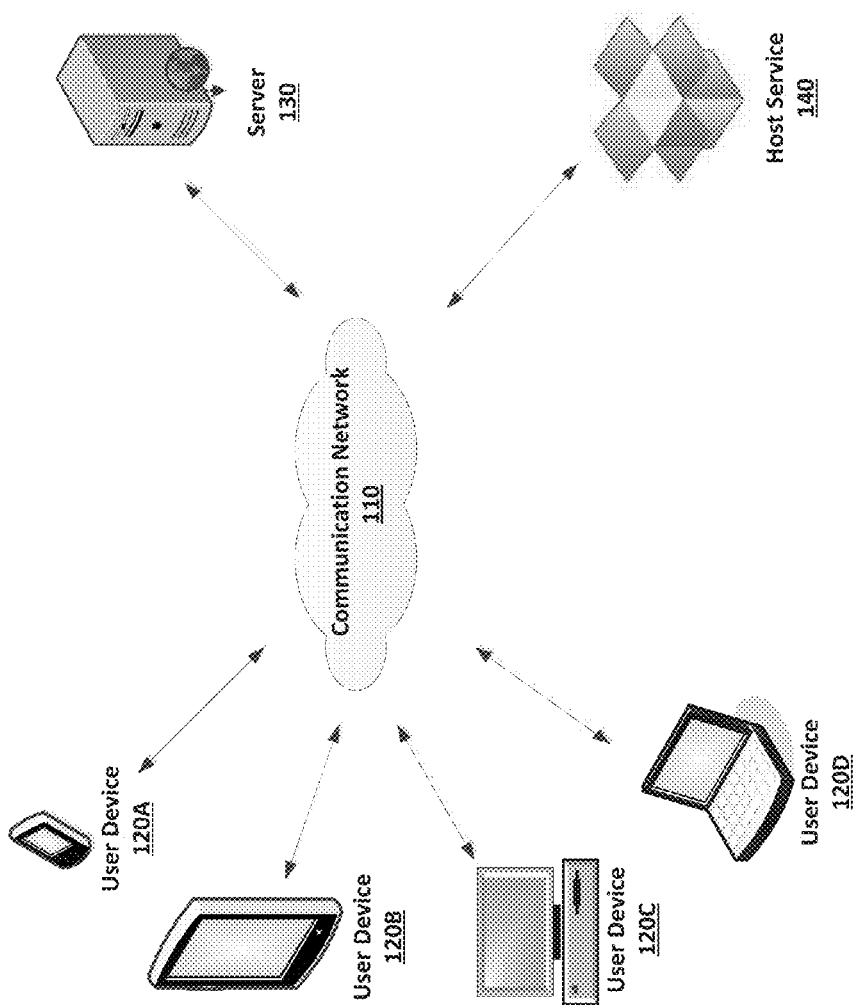
FIG. 1 illustrates a network environment in which an exemplary system for maintaining a client state upon disconnection may be implemented.

FIG. 1 illustrates a network environment 100 in which a system for maintaining a client state upon disconnection may be implemented. Network environment 100 may include a communication network 110, one or more user devices 120A-D, a server 130, and one or more host services 140. Devices and services in network environment 100 may communicate with each other via communications network 110.

Communication network 110 may be a local, proprietary network (e.g., an intranet) and/or may be a part of a larger wide-area network (e.g., the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic computing user devices 120A-D, which may include general purpose computers, mobile phones, smartphones, personal digital assistants (PDAs), portable computing devices (e.g., laptop, netbook, tablets), desktop computing devices, handheld computing device, or any other type of computing device capable of communicating over communication network 110. Such devices 120A-D may also be configured to access data from other storage media, such as, but not limited to memory cards or disk drives as may be appropriate in the case of downloaded services. Such devices 120A-D may include standard hardware computing components such as, but not limited to network and media interfaces, non-transitory computer-readable storage (memory), and processors for executing instructions that may be stored in memory.

User device 120A is illustrated as a mobile phone or smartphone, user device 120B is illustrated as a tablet computing device, user device 120C is illustrated as a desktop computing device, and user device 120D is illustrated as a laptop computing device. As can be seen, each device is sized differently and/or has different input options. Exemplary embodiments of the present invention allow for tasks and applications that are specific to one device (e.g., operating in a Microsoft Windows® environment) to be used and optimized for another user device (e.g., operating in an Apple iOS® environment).

Each user device 120 may act as a host device interacting with another user device 120 that acts as a client; likewise, each user device 120 may act as the client device in communication with another user device 120 acting as a host. A user device 120 may further include a client application, a client 3D library, and a client display driver. Collectively, these elements may enable the user device and the user to consume computer graphics resources or services provided by server 130.

Server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may be associated with the same user and located in the same local network as user device 120. Alternatively, server 130 may be located remotely (e.g., in the cloud) and may be associated with a third party that provides services in accordance with embodiments of the present invention. In some instances, the services may be provided via software (e.g., software as a service) downloaded from server 130 to one or more user devices 120. Updated software may similarly be downloaded as the updates become available or as needed. In this regard, host service 140 may be associated with one or more servers that specifically provides hosting services through the cloud.

Server application may represent an application executing ("running") on server 130. The functionality of server application may be visible to and accessible by client 120 via application publishing over the cloud (e.g., communication network 110), such as that supported by GraphOn GO-Global, Microsoft Remote Desktop Services, and Citrix XenApp. Examples of server application 132 may include a computer-aided design (CAD) application, such as AutoCAD® (by Autodesk, Inc. of San Rafael, Calif.) or Cadence Virtuoso (by Cadence Design Systems of San Jose, Calif.), a medical clinical workflow application such as Symbia.net (by Siemens AG of Munich, Germany), an interactive mapping application such as Google Earth (by Google, Inc of Mountain View, Calif.), or a 3D game.

In a remote access system, such as client-server computing system 100, the "remoting" software may be installed and executing (i.e., "running") on a host device (e.g., host device 120C). Such software may allow users to remotely access applications that are installed on host device 120C. By way of example, a set of applications may be installed on host device 120C. Such applications represent any applications, programs, and/or processes executing (i.e., "running") on host device 120C. The functionality of the applications shall be visible to and accessible by client devices (e.g., client device 120B) via communication network 110 using a process herein known as application publishing, which is currently supported by such products as GraphOn GO-Global, Microsoft Remote Desktop Services, and Citrix XenApp. Such application publishing may also be performed in accordance with teachings of commonly-owned U.S. Pat. No. 5,831,609 filed Jun. 6, 1995 and entitled "Method and system for dynamic translation between different graphical user interface systems" which is incorporated by reference as though fully set forth herein. Such functionalities are also described in further detail in co-pending U.S. patent application Ser. No. 13/481,743, the disclosure of which is incorporated herein by reference. Where there are multiple possible applications that can be used to open the first document, the user may designate a preferred application for the document type, or the user may be provided with a menu of the possible applications for selection.

In one embodiment of the present invention, host device 120C comprises a set of applications that are made available and accessible to client devices 120B via a remote session established over communication network 110. A user can then access and modify a document opened from the set of applications via client devices 120B and save the modified document that is available from the set of applications (e.g., documents in Microsoft® Word). When the remote session is disrupted (e.g., the client device 120B is disconnected from host device 120C) intentionally or not, a current state of the remote session (including documents and/or files that were modified by client devices 120B) are automatically stored on server 130. In some embodiments, the state information may further include information regarding session identifier, unique security tokens, and other information regarding the client device 120B, host device 120C, and the established session. Parts of the information may also be saved to the either host or client device 120B-C (e.g., cache or draft folder). The next time a connection is established, the stored state information, which may include information stored at host device 120C, client device 120B, and/or server 130 may be made available. Thus, anything that a user is working on remotely is saved when the connection to communication network 110 is detected as having been disrupted. In other words, the client state is maintained upon disconnection from communication network 110.

In another embodiment, when a connection is disrupted, one or more devices involved in the remote session may attempt to reestablish the connection for a predetermined amount of time. If the connection is reestablished within a predetermined amount of time, the remote session may be resumed using the stored state information as if the disconnection had never occurred. If reconnection does not occur within the predetermined amount of time, the files (e.g., documents) that were open or manipulated in the session may be saved to a backup folder or cache. In some embodiments, the stored files may be made available to edit or modify in an off-line mode. In this regard, the user may be given the option of invoking an offline mode when no connection to communication network 110 is available. In such instances, the file may be maintained as a plurality of versions, which may be read-only depending on the type of file and application resources available on the client device 120B. The next time client device 120B reconnects to server 130 via communication network 110, the user of client device 120B may be given the option of recovering one or more versions of the file.

One example of using offline mode may arise where a user is at an airport and is remotely accessing a document hosted on host device 120C (or host service 140) using client device 120B which is connected to server 130 via communication network 110. The user may, however, need to board a plane, yet need to be able to continue work on the document. In that instance, the user may be given the option of saving (a version of) the file locally on client device 120B and close the file hosted on host device 120C. As a result, the user is able to open the document locally on client device 120B and to continue to working on the plane when connections to communication network 110 are not possible or reliable.

Figure 2:
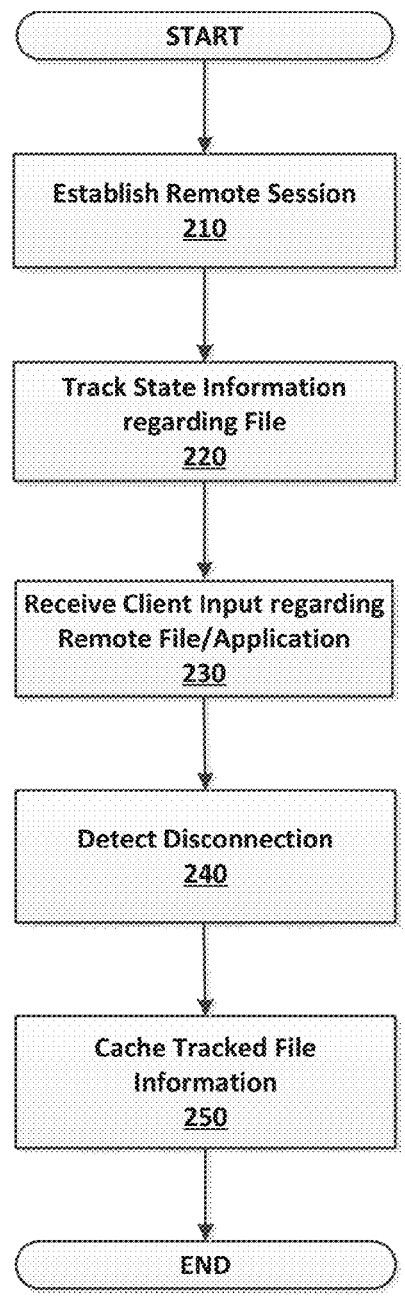
FIG. 2 is a flowchart illustrating an exemplary method for maintaining a client state upon disconnection.

FIG. 2 illustrates a method 200 for file caching upon disconnection from a remotely accessed application. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a remote session is established between a host device and a client device via a communication network that allows the client device access to a file at host device but executed via an application at the client device. Information regarding a state of the file is tracked locally by the client device. Client input may be received regarding manipulation of the file. A disconnection may be detected that terminates the remote session with the host device. The tracked information is cached for subsequent updating when the remote session with the host device is later reestablished.

In step 210, a client device (e.g., user device 120B) establishes a remote session with host device (e.g., host device 120C). Such a remote session allows the client device 120B to access resources hosted by host device 120C over a wireless communication network 110. For example, the client device 120B may request access to a particular file hosted by host device 120C and executed by an application hosted by client device 120B.

In step 220, state information regarding the file may be tracked at the client device 120B. For example, a current state of the content may be detected, identified, and stored in memory of the client device 120B.

In step 230, user input may be received at the client device 120B, which may result in changing the state of the file. For example, various user manipulations to content may be initiated via a user interface of the client device 120B. A text document, for example, may be manipulated via addition, deletion, or other type of edit to the text.

In step 240, the connection between the client device 120B and the host device 120C may be disrupted for any variety of reasons. The disconnection would mean the termination of the remote session between the client device 120B and the host device 120C. In this regard, the client device 120B may detect the disconnection or otherwise determine that the remote session has been terminated.

In step 250, the tracked information regarding the file may be cached in local memory of the client device 120B. Such cached information may be used to synchronize the file between the client device 120B and the host device 120C when the connection (and the remote session) between the two devices is restored.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for file caching upon disconnection from a remotely accessed application, the method comprising:
   establishing a remote session between a host device and a client device via a communication network, wherein the client device is allowed to access resources hosted on the host device via the established remote session;
   accessing, by the client device, a file hosted on the host device, wherein the file is opened using an application at the host device;
   tracking information regarding a state of the file at the client device, the tracked information being stored in memory of the client device;
   detecting that a connection between the host device and the client device has been interrupted, wherein the remote session is terminated; and
   caching information regarding the file upon detection that the connection has been interrupted, the information being stored in memory, wherein the cached information is used to update the file hosted on the host device when another connection is established.

2. The method of claim 1, further comprising caching information regarding the established remote session between the host device and the client device.

3. The method of claim 2, wherein the cached information includes at least one of session identifier, unique security token, information regarding the client device, information regarding the host device, and information regarding the established remote session.

4. The method of claim 2, wherein the cached information is further used to automatically establish another remote session between the host device and the client device when the other connection is established.

5. The method of claim 1, wherein the cached information is cached in a cache folder.

6. The method of claim 1, wherein the cached information is cached in a draft folder.

7. The method of claim 1, wherein caching occurs after a predetermined number of attempts to reestablish the disrupted connection.

8. The method of claim 1, wherein caching occurs after a predetermined amount of time without any success in reestablishing the disrupted connection.

9. A device for file caching upon disconnection from a remotely accessed application, the device comprising:
   a communication interface that:
      establishes a remote session with a host device via a communication network, wherein the established remote session allows for access to resources hosted on the host device, and
      accesses a file hosted on the host device, wherein the file is opened using an application at the host device;
   memory that stores tracked information regarding a state of the file; and
   a processor that executes instructions stored in memory, wherein execution of the instructions by the processor:
      detects that a connection with the host device has been interrupted, wherein the remote session is terminated; and
      initiates caching of information regarding the file upon detection that the connection has been interrupted, the information being stored in memory, wherein the cached information is used to update the file hosted on the host device when another connection is established.

10. The device of claim 9, wherein the processor further initiates caching of information regarding the established remote session with the host device.

11. The device of claim 10, wherein the cached information includes at least one of session identifier, unique security token, information regarding the client device, information regarding the host device, and information regarding the established remote session.

12. The device of claim 10, wherein the cached information is further used to automatically establish another remote session between the host device and the client device when the other connection is established.

13. The device of claim 9, wherein the cached information is cached in a cache folder in memory.

14. The device of claim 9, wherein the cached information is cached in a draft folder in memory.

15. The device of claim 9, wherein the processor initiates the caching after a predetermined number of attempts to reestablish the disrupted connection.

16. The device of claim 9, wherein the processor initiates the caching after a predetermined amount of time without any success in reestablishing the disrupted connection.

17. A non-transitory computer-readable storage medium, having embodied thereon a program executable by a processor to perform a method for file caching upon disconnection from a remotely accessed application, the method comprising:
   establishing a remote session between a host device and a client device via a communication network, wherein the client device is allowed to access resources hosted on the host device via the established remote session;
   accessing, by the client device, a file hosted on the host device, wherein the file is opened using an application at the host device;
   tracking information regarding a state of the file at the client device, the tracked information being stored in memory of the client device;
   detecting that a connection between the host device and the client device has been interrupted, wherein the remote session is terminated; and
   caching information regarding the file upon detection that the connection has been interrupted, the information being stored in memory, wherein the cached information is used to update the file hosted on the host device when another connection is established.

* * * * *